US011494775B2

(12) United States Patent
Kang et al.

(10) Patent No.: US 11,494,775 B2
(45) Date of Patent: Nov. 8, 2022

(54) METHODS AND APPARATUS FOR PAYMENT FRAUD DETECTION

(71) Applicant: Walmart Apollo, LLC, Bentonville, AR (US)

(72) Inventors: Linhong Kang, Sunnyvale, CA (US); Kazuo Matsumoto, Santa Clara, CA (US); Premalatha Thangamani, Fremont, CA (US); Jing XiA, Dublin, CA (US); Saurabh Vivek Gagpalliwar, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 504 days.

(21) Appl. No.: 16/560,764

(22) Filed: Sep. 4, 2019

(65) Prior Publication Data
US 2021/0065192 A1    Mar. 4, 2021

(51) Int. Cl.
*G06Q 20/40* (2012.01)
*G06Q 30/06* (2012.01)
*G06N 20/00* (2019.01)

(52) U.S. Cl.
CPC ......... *G06Q 20/4016* (2013.01); *G06N 20/00* (2019.01); *G06Q 30/0609* (2013.01)

(58) Field of Classification Search
CPC ............. G06Q 20/00–425; G06Q 2220/00–18
See application file for complete search history.

(56) References Cited

U.S. PATENT DOCUMENTS

| 10,162,630 B2 | 12/2018 | Bouley et al. | |
| 10,510,025 B2 * | 12/2019 | Zoldi | G06Q 10/04 |
| 10,896,421 B2 * | 1/2021 | Adjaoute | G06Q 20/384 |
| 11,049,012 B2 | 6/2021 | Zoldi et al. | |
| 11,151,450 B2 | 10/2021 | Zoldi et al. | |
| 2006/0224399 A1 * | 10/2006 | Alkemper | G06Q 10/06 705/41 |
| 2008/0275748 A1 * | 11/2008 | John | G06F 21/35 705/26.1 |
| 2014/0122336 A1 * | 5/2014 | Rich | G06Q 20/4037 705/44 |

(Continued)

*Primary Examiner* — John W Hayes
*Assistant Examiner* — Chenyuh Kuo
(74) *Attorney, Agent, or Firm* — Morgan, Lewis & Bockius LLP; Manita Rawat

(57) ABSTRACT

This application relates to apparatus and methods for identifying fraudulent transactions. In some examples, a computing device generates a decision matrix to identify fraudulent transactions. To generate the decision matrix, the computing device may determine scores for a plurality of transactions, and may determine transaction categories for each transaction based on the scores. The computing device may also determine a number of predictable features based on applying machine learning techniques to the transactions. A risk category is then determined for the number of predictable features. The computing device generates the decision matrix based on the transaction categories and the risk categories. In some examples, the computing device applies the generated decision matrix to an ongoing purchase transaction to determine if the ongoing purchase transaction is fraudulent. In some examples, the computing device prevents completion of the purchase transaction if the purchase transaction is determined to be fraudulent.

18 Claims, 8 Drawing Sheets

(56) References Cited

U.S. PATENT DOCUMENTS

| | | | |
|---|---|---|---|
| 2018/0350006 A1* | 12/2018 | Agrawal | G06F 7/026 |
| 2019/0073647 A1* | 3/2019 | Zoldi | G06Q 20/383 |
| 2020/0327470 A1 | 10/2020 | Trim et al. | |
| 2021/0103580 A1* | 4/2021 | Schierz | G06Q 30/0185 |

* cited by examiner

| | FRAUD PROB. TIER 502 | FIRST FEATURE BIN 504 | SECOND FEATURE BIN 506 | LAST FEATURE BIN 508 | FRAUD RATE 510 | IMPACTED ORDERS 512 | IMPACTED GMV 514 | DECISION 516 |
|---|---|---|---|---|---|---|---|---|
| 550 | B | R1 | R1 | R1 | 45% | 0.5% | 0.3% | DENY |
| 552 | B | R2 | R1 | R1 | 42% | 0.3% | 0.2% | DENY |
| 554 | B | R3 | R2 | R1 | 35% | 0.7% | 0.5% | DENY |
| 556 | B | R4 | R2 | R2 | 29% | 0.5% | 0.3% | DENY |
| 558 | C | R1 | R3 | R3 | 25% | 2% | 1% | CHALLENGE |
| 560 | D | R4 | R3 | R4 | 0.03% | 50% | 65% | ACCEPT |

FIG. 5

METHODS AND APPARATUS FOR PAYMENT FRAUD DETECTION

TECHNICAL FIELD

The disclosure relates generally to fraud detection and, more specifically, to identifying fraudulent retail activities.

BACKGROUND

Some transactions, such as some in-store or online retail transactions, are fraudulent. For example, a customer may attempt to purchase an item using a payment form, such as a credit card, belonging to another person. The customer may have stolen or found the payment form, and is now attempting to use the payment form for the purchase without permission from the payment form's rightful owner. In some cases, such as with in-store purchases, a customer may present another's identification (ID) card (e.g., driver's license), in addition to the payment form, when attempting to purchase the item, thereby facilitating the in-store fraudulent purchase.

Conveniences associated with online retail purchases also may facilitate fraudulent online transactions. For example, at least some retail websites allow a customer to make purchases without "signing in." Instead of logging into an account of the customer on the website, the customer may choose to proceed under a "guest" option that does not require the customer to sign in to a particular account. In addition, at least some retail websites allow a customer to ship purchased products to any address, such as a store location (e.g., ship-to-store), or a home location (e.g., ship-to-home). Although some retailers may require the showing of an ID when a customer shows to pick up a purchased item at a store, as noted above the customer may have an ID card of the victimized person. Thus, these online purchase conveniences may facilitate fraudulent online retail transactions.

In each of these examples, the customer is involved in a fraudulent activity. Fraudulent activities may cause financial harm to a company, such as a retailer. For example, the true owner of the payment form may identify the fraudulent transaction and have the transaction cancelled. As such, the retailer may not receive payment for the purchase items. Thus, retailers may benefit from identifying fraudulent transactions before they are completed.

SUMMARY

The embodiments described herein are directed to automatically identifying fraudulent transactions. The embodiments may identify a fraudulent activity as it is taking place, for example, allowing a retailer to stop or not allow the transaction. In some examples, the embodiments may allow a retailer to identify a suspected fraudulent in-store or online purchase. The transaction may be disallowed, or may be presented for closer review to determine if fraud is indeed involved. As a result, the embodiments may allow a retailer to decrease expenses related to fraudulent transactions.

In accordance with various embodiments, exemplary systems may be implemented in any suitable hardware or hardware and software, such as in any suitable computing device. For example, in some embodiments, a computing device is configured to receive purchase data identifying at least one purchase transaction. The computing device is also configured to determine a value category for the at least one purchase transaction based on at least a first value identifying whether the at least one purchase transaction is fraudulent. Further, the computing device is configured to determine a plurality of features based on the purchase data, wherein each feature of the plurality of features is associated with at least a second value. The computing device is also configured to determine a risk category for each of the plurality of features based on the at least second value. The computing device is further configured to determine whether the at least one purchase transaction is fraudulent based on the determined value categories and the determined risk categories. The computing device may also be configured to transmit transaction allowability data identifying whether the at least one purchase transaction is fraudulent based on the determination.

In some embodiments, a method is provided that includes receiving purchase data identifying at least one purchase transaction. The method also includes determining a value category for the at least one purchase transaction based on at least a first value identifying whether the at least one purchase transaction is fraudulent. Further, the method includes determining a plurality of features based on the purchase data, wherein each feature of the plurality of features is associated with at least a second value. The method also includes determining a risk category for each of the plurality of features based on the at least second value. The method further includes determining whether the at least one purchase transaction is fraudulent based on the determined value categories and the determined risk categories. The method may also include transmitting transaction allowability data identifying whether the at least one purchase transaction is fraudulent based on the determination.

In yet other embodiments, a non-transitory computer readable medium has instructions stored thereon, where the instructions, when executed by at least one processor, cause a computing device to perform operations that include determining a value category for the at least one purchase transaction based on at least a first value identifying whether the at least one purchase transaction is fraudulent. Further, the operations include determining a plurality of features based on the purchase data, wherein each feature of the plurality of features is associated with at least a second value. The operations also include determining a risk category for each of the plurality of features based on the at least second value. The operations further include determining whether the at least one purchase transaction is fraudulent based on the determined value categories and the determined risk categories. The operations may also include transmitting transaction allowability data identifying whether the at least one purchase transaction is fraudulent based on the determination.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 5 is an example of a decision matrix that may be generated by the fraud detection computing device of FIG. 2 in accordance with some embodiments;

DETAILED DESCRIPTION

Figure 1:
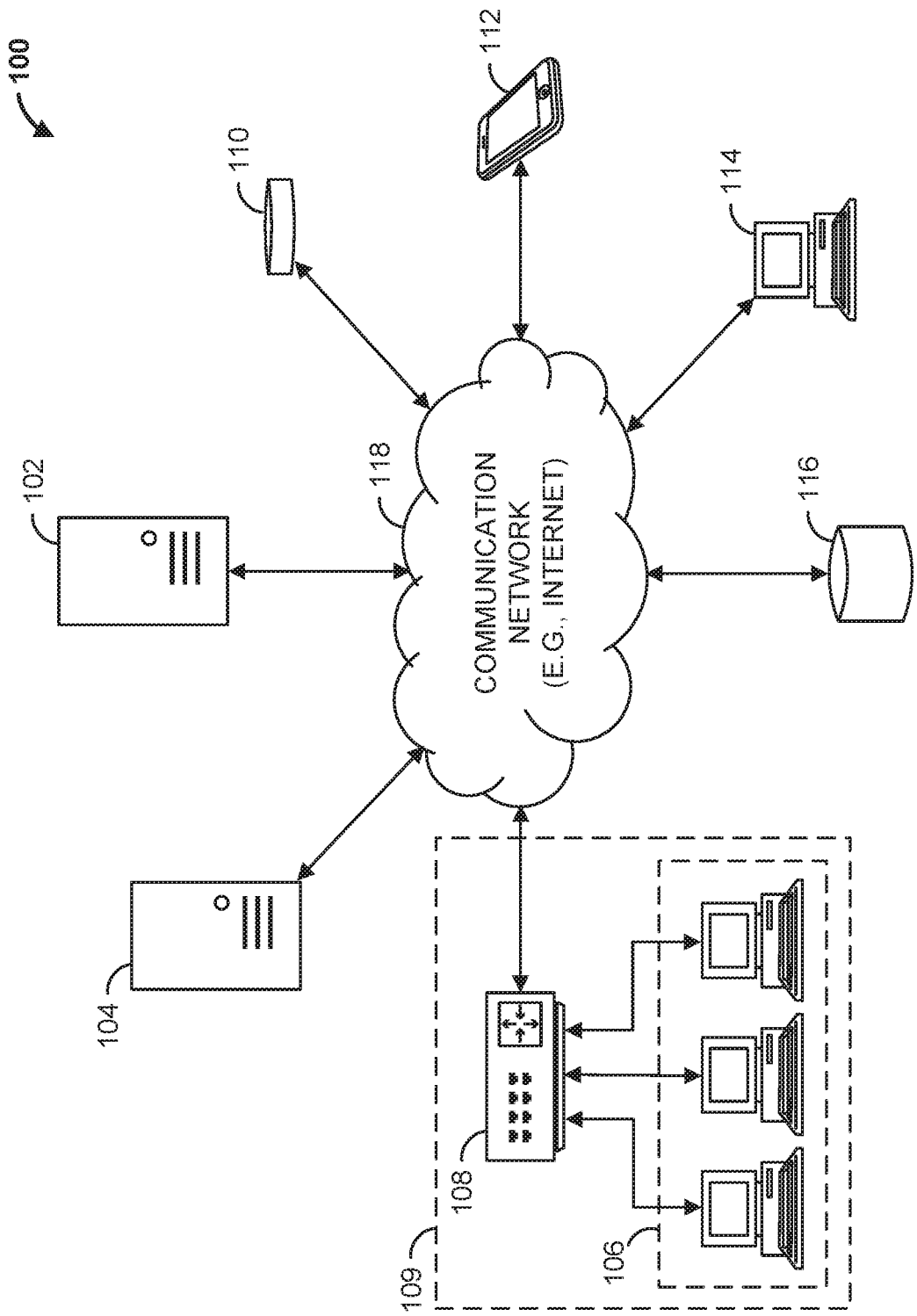
FIG. 1 is a block diagram of a fraud detection system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a fraud detection system 100 that includes a fraud detection computing device 102 (e.g., a server, such as an application server), a web server 104, workstation(s) 106, database 116, and multiple customer computing devices 110, 112, 114 operatively coupled over network 118. Fraud detection computing device 102, workstation(s) 106, web server 104, and multiple customer computing devices 110, 112, 114 can each be any suitable computing device that includes any hardware or hardware and software combination for processing and handling information. In addition, each can transmit data to, and receive data from, communication network 118.

For example, fraud detection computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Additionally, each of fraud detection computing device 102, web server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, fraud detection system 100 can include any number of customer computing devices 110, 112, 114. Similarly, fraud detection system 100 can include any number of workstation(s) 106, fraud detection computing devices 102, web servers 104, and databases 116.

Workstation(s) 106 are operably coupled to communication network 118 via router (or switch) 108. Workstation(s) 106 and/or router 108 may be located at a store 109, for example. Workstation(s) 106 can communicate with fraud detection computing device 102 over communication network 118. The workstation(s) 106 may send data to, and receive data from, fraud detection computing device 102. For example, the workstation(s) 106 may transmit data related to a transaction, such as a purchase transaction, to fraud detection computing device 102. In response, fraud detection computing device 102 may transmit an indication of whether the transaction is to be allowed. Workstation(s) 106 may also communicate with web server 104. For example, web server 104 may host one or more web pages, such as a retailer's website. Workstation(s) 106 may be operable to access and program (e.g., configure) the webpages hosted by web server 104.

Fraud detection computing device 102 is operable to communicate with database 116 over communication network 118. For example, fraud detection computing device 102 can store data to, and read data from, database 116. Database 116 can be a remote storage device, such as a cloud-based server, a memory device on another application server, a networked computer, or any other suitable remote storage. Although shown remote to fraud detection computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items. In some examples, web server 104 may transmit data that identifies the attempted purchase transaction to fraud detection computing device 102. In response, fraud detection computing device 102 may transmit an indication of whether the transaction is to be allowed.

Fraud detection system 100 may identify fraudulent transactions. For example, fraud detection system 100 may identify an attempted in-store purchase of an item as fraudulent. Fraud detection system 100 may also identify online purchases as fraudulent. In some examples, fraud detection system 100 may prohibit the completion of a transaction determined to be fraudulent.

To identify fraudulent transactions, fraud detection system 100 may generate decision matrix data identifying conditions (e.g., requirements) that must be met for a transaction to be identified as fraudulent. For example, fraud detection system 100 may receive transaction data identifying in-store or online (e.g., real-time) transaction, and determine if the transaction is fraudulent based on the generated decision matrix data. In some examples, if the transaction is identified as fraudulent, fraud detection system 100 may deny the transaction. The decision matrix data may also identify conditions that, when met, indicate that a transaction is not fraudulent. If fraud detection 100 determines, based on the generated matrix decision data, that a transaction is not fraudulent, fraud detection system 100 may allow the transaction. In some examples, fraud detection system 100 identifies a transaction as needing review. In these examples, fraud detection system 100 may transmit the transaction for review (e.g., to be approved) by a retailer (e.g., a review manager, employee of the retailer, review team, etc.). Fraud detection system 100 may allow or deny the transaction based on the review of the transaction.

Feature Selection

To generate decision matrix data, fraud detection system 100 may execute one or more fraud detection models that operate on historical transaction data to generate fraud detection scores. Historical transaction data may include, for example, data identifying previous customers (e.g., client identification (ID), email address, home address, favored store location, phone number, etc.), data identifying previous in-store transactions (e.g., purchase dates, item IDs, item purchase amounts, etc.), and data identifying previous online purchases (e.g., online IDs, purchase dates, item IDs, item purchase amounts, etc.). The generated fraud detection scores from each fraud detection model may identify, for example, probabilities that each particular historical transaction is a fraud. Each fraud detection model may be based on, for example, one or more decision trees, supervised machine learning algorithms such as Logic Regression, Support Vector Machines, Random Forest, Gradient Boosting Machines (e.g., XGBoost), or any other suitable fraud detection models. The machine learning algorithms may be trained, for example, on historical transaction data.

In some examples, the fraud detection models are based on one or more machine learning algorithms, such as Logistics Regression, Random Forest, Gradient Boosting Machines, or any other suitable learning algorithms. In some examples, the fraud detection models operate on historical data that has been segmented. For example, fraud detection system 100 may segment the historical data based on one or more features of each historical transaction, such as whether a customer is attempting to use a guest checkout feature for an online purchase, or is using an account the customer signed into.

Fraud detection system 100 may also apply one or more machine learning algorithms, such as Logistics Regression, Random Forest, Gradient Boosting Machines, or any other suitable learning algorithms, to identify a number of features of the historical transaction data that are most predictable of the fraud detection scores. For example, the number of most predictable features may be the ones that are most correlated with the generated fraud detection scores. For example, fraud detection system 100 may execute the one or more machine learning algorithms to identify those features (e.g., portions of historical data) that, if present, are associated with a probability that a transaction is fraudulent over a certain amount, such as 45%. Features may include any data related to the transaction, any data related to the customer's historical purchase transactions, any data related to the customer, or any other suitable data as determined by the machine learning algorithms. The machine learning algorithms may be trained, for example, on historical transaction data.

Binning Data

Fraud detection system 100 may also bin (e.g., group, categorize) the historical transaction data associated with each of the identified predictable features. For example, fraud detection system 100 may execute one or more binning algorithms to bin the historical transaction data associated with each of the identified predictable features into risk categories. The binning algorithms may include, for example, feature scaling and normalization, weight of the evidence, variations of principal component analysis (PCA), or any other suitable binning algorithm. As an example, assume the length of an email address for a customer is determined to be a most predictable feature of fraudulent activities. Fraud detection system 100 may execute a binning algorithm that associates each email address for each customer of each historical transaction in one of a number of bins based on the length of each email address.

For example, a historical transaction that includes an email addresses with a character length of less than or equal to 17 may be associated with a first bin. Historical transactions that include an email address with a character length of less than or equal to 19, but greater than 17, may be associated with a second bin. Similarly, historical transactions that include an email address with a character length of less than or equal to 21, but greater than 19, may be associated with a third bin; historical transactions that include an email address with a character length of less than or equal to 23, but greater than 22, may be associated with a fourth bin; historical transactions that include an email address with a character length of less than or equal to 26, but greater than 23, may be associated with a fifth bin; and historical transactions that include an email address with a character length greater than 26 may be associated with a sixth bin. In addition, historical transactions associated with no email address may be associated with a seventh bin.

Fraud Detection Model Score Tier Generation

Based on the fraud detection scores generated for the most predictable features in the feature selection step above, fraud detection system 100 tiers (e.g., categorizes) each of the corresponding historical transactions. For example, fraud detection scores within a first range may be associated with a first tier, fraud detection scores within a second range may be associated with a second tier, fraud detection scores within a third range may be associated with a third tier, and fraud detection scores within a fourth range may be associated with a fourth tier.

As noted above, in some examples, the fraud detection scores generated by the fraud detection models may identify fraudulent probabilities. In one example, fraud detection scores for transactions identifying a fraud probability of greater than or equal to 40% are associated with a first tier. Fraud detection scores for transactions identifying a fraud probability of greater than or equal to 20%, but less than 40%, are associated with a second tier. Fraud detection scores for transactions identifying a fraud probability of greater than or equal to 5%, but less than 20%, are associated with a third tier. Fraud detection scores for transactions identifying a fraud probability less than 5% are associated with a fourth tier. Although in this example four tiers are described, the number of tiers may be less than, or greater than, four (e.g., 2, 5, 10, 16, etc.).

In some examples, fraud detection system 100 may combine (e.g., consolidate) the score tiers from various fraud detection models to generate common tiers that each of the corresponding historical transactions may be associated with. For example, although different fraud detection models may have different score ranges, the score tiers for each of the fraud detection models would be the same.

Decision Matrix Generation

Based on the tier each historical transaction is associated with, as well as the bin each predictable feature is associated with, fraud detection system 100 generates a decision matrix that identifies transaction allowability decisions. The decision matrix may identify various conditions (e.g., requirements) for a transaction to be identified as fraudulent and therefore denied.

For example, as a customer is attempting to purchase one or more items at store 109, workstation 106 may transmit in-store transaction data identifying the transaction to fraud detection computing device 102. Fraud detection computing device 102 may determine whether the transaction is to be allowed based on applying one or more fraud detection models to the particular transaction to determine a corresponding tier. In some examples, a determination is made as to a segment that the transaction is associated with. Based on the determined segment, a particular fraud detection model is applied to the transaction. Fraud detection computing device 102 may also determine a bin for each predictable feature associated with the particular transaction. Fraud detection computing device 102 may then apply the decision matrix to the determined tier and bins for the particular transaction to determine if the transaction is fraudulent. In some examples, one or more of fraud detection computing device 102 and workstation 106 prevent the transaction from occurring if the transaction is identified as fraudulent.

Similarly, as a customer is attempting to purchase, via a customer computing device 110, 112, 114, one or more items on a website hosted by web server 104, web server 104 may transmit online transaction data identifying the transaction to fraud detection computing device 102. Fraud detection computing device 102 may determine whether the transaction is to be allowed based on applying the decision matrix to determined tier and bins for the particular online transaction. In some examples, one or more of fraud detection computing device 102 and web server 104 prevent the transaction from occurring if the transaction is identified as fraudulent.

Figure 2:
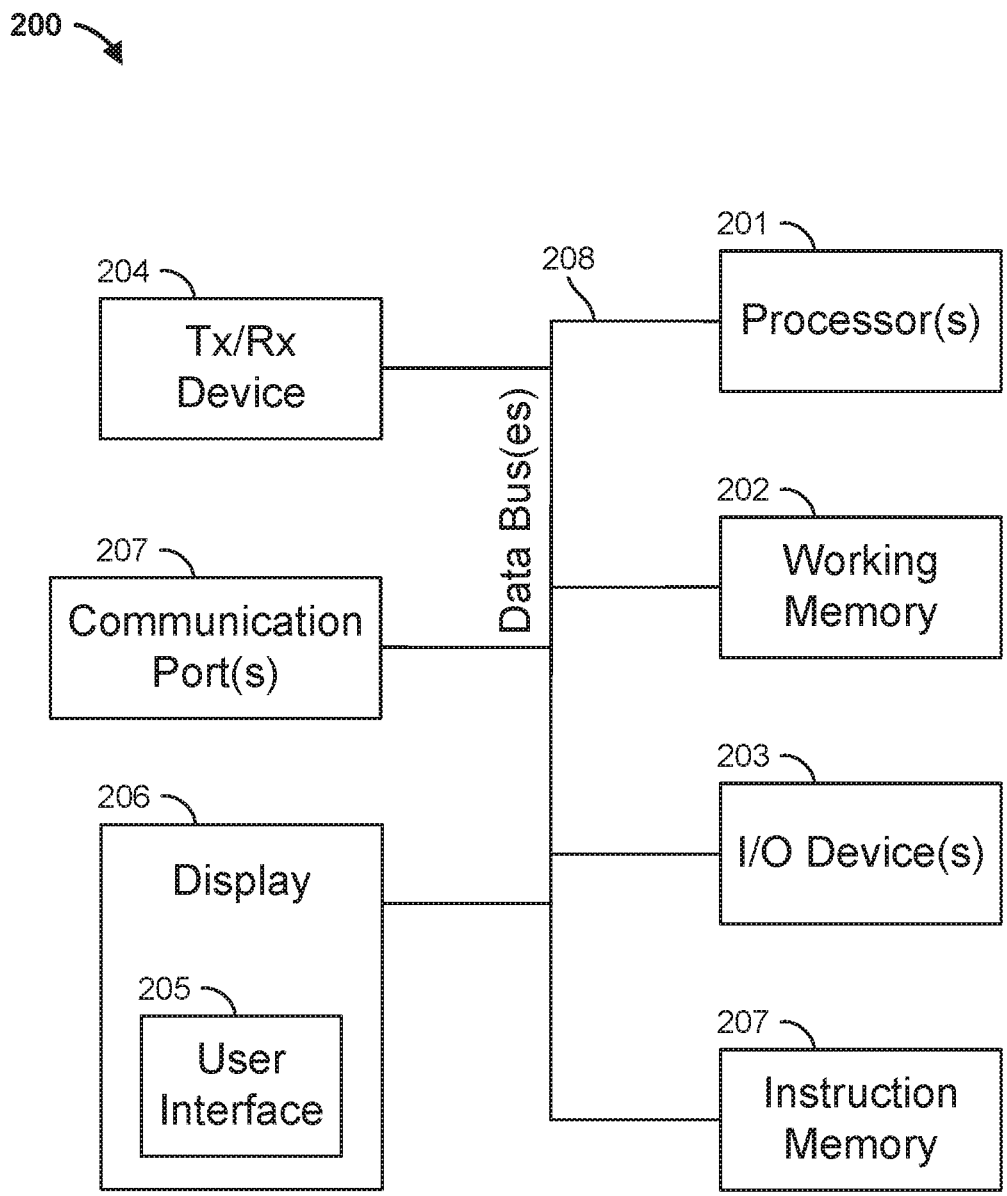
FIG. 2 is a block diagram of the fraud detection computing device of the fraud detection system of FIG. 1 in accordance with some embodiments.

FIG. 2 illustrates the fraud detection computing device 102 of FIG. 1. Fraud detection computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of fraud detection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as transaction data.

Display 206 can display user interface 205. User interfaces 205 can enable user interaction with fraud detection computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 fraud detection computing device 102 will be operating in. Processor(s) 201 is operable to receive data from, or send data to, a network, such as communication network 118 of FIG. 1, via transceiver 204.

Figure 3:
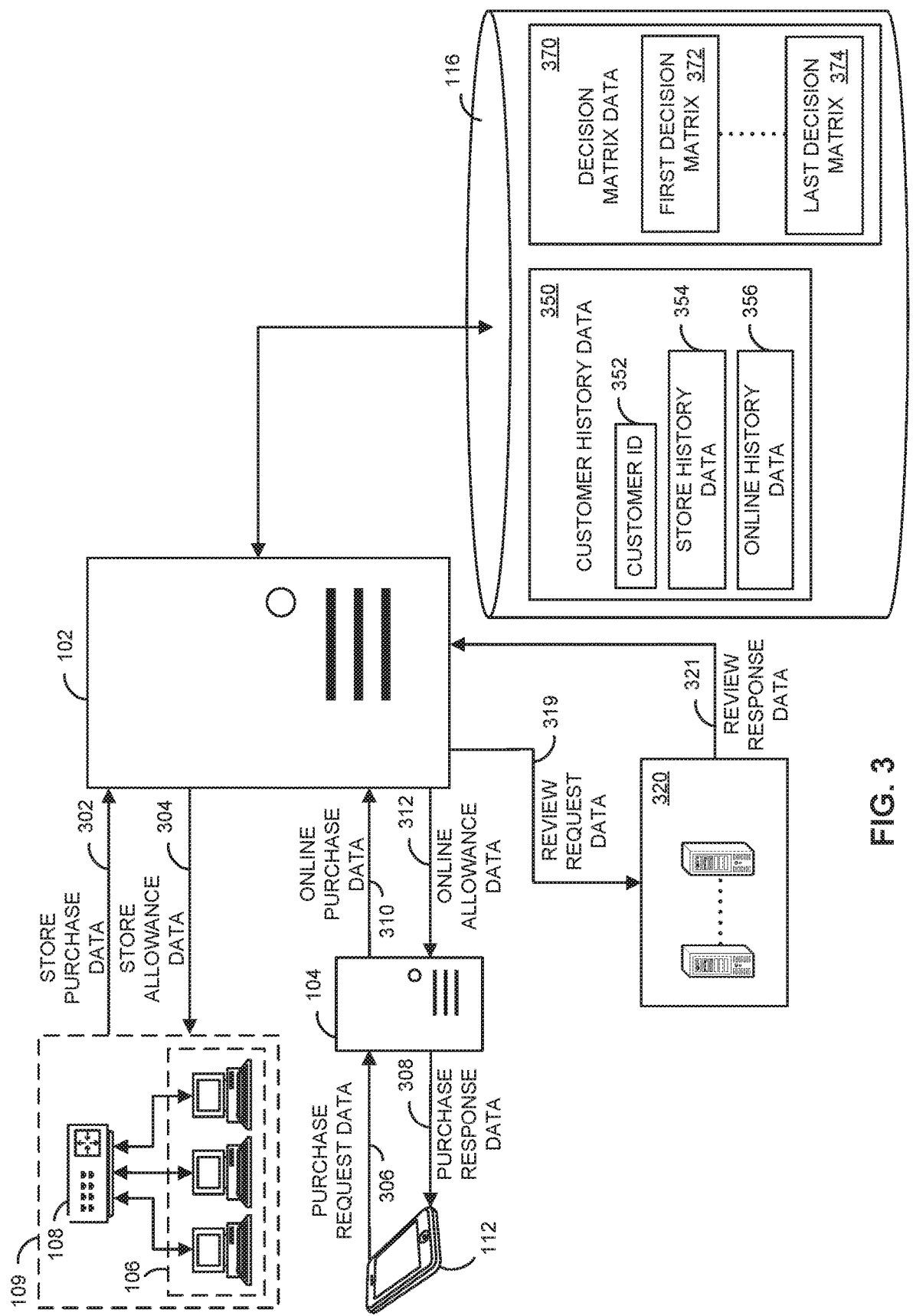
FIG. 3 is a block diagram illustrating examples of various portions of the fraud detection system of FIG. 1 in accordance with some embodiments.

FIG. 3 is a block diagram illustrating examples of various portions of the fraud detection system of FIG. 1. In this example, fraud detection computing device 102 can receive from a store 109 (e.g., from a computing device, such as workstation 106, at store location 109) store purchase data 302 identifying the purchase attempt of one or more items. Store purchase data 302 may include, for example, one or more of the following: an identification of one or more items being purchased; an identification of the customer (e.g., customer ID, passport ID, driver's license number, etc.); an image of an identification of the customer; a monetary amount (e.g., price) of each item being returned; the method of payment used to purchase the items (e.g., credit card, cash, check); a Universal Product Code (UPC) number for each item; a time and/or date; and/or any other data related to the attempted purchase transaction.

Fraud detection computing device 102 may execute one or more fraud detection models based on store purchase data 302 to generate one or more fraud detection scores. In some examples, fraud detection score 102 associates customer history data 350 with store purchase data 302. For example, store purchase data 302 may identify a name or ID of the customer. Based on the name or ID of the customer, fraud detection computing device may obtain customer history data 350 from database 116 for the customer. Customer history data 350 may include, for example, a customer ID 352 (e.g., a customer name, an ID number, online ID, etc.), store history data 354 identifying historical in-store purchase transactions, and online history data 356 identifying online purchase transactions for the customer.

Fraud detection computing device 102 may determine a tier based on the fraud detection scores. For example, fraud detection computing device 102 may determine the tier based on a range each fraud detection score falls within. Fraud detection computing device 102 may then consolidate the determined tiers to generate a global tier for the purchase transaction identified by store purchase data 302.

Fraud detection computing device 102 may also determine a bin for one or more predictable features associated with store purchase data 302. The predictable features may have been predetermined by fraud detection computing device. For example, fraud detection computing device 102 may determine, based on store purchase data 302 and/or associated customer history data 350, a bin for each predetermined predictable feature based on the application of one or more binning algorithms. In some examples, the binning algorithm is a decision tree. Execution of the decision tree may determine a bin based on a value of the predictable feature. In some examples, execution of the decision tree may determine a bin based on the presence, or absence, of the predictable feature. For example, the decision tree may determine a first bin if the customer has made a purchase in the last 30 days, and determine a second bin if not.

Fraud detection computing device 102 may then apply a decision matrix, such as one identified by decision matrix data 370 in database 116, to the determined tier and bins to determine if the transaction identified by store purchase data 302 is fraudulent. For example, fraud detection computing device 102 may compare the determined tier and bins to tiers and bins identified by decision matrix data 370 to determine whether store purchase data 302 is fraudulent.

Similarly, fraud detection computing device 102 can receive from a web server 104 online purchase data 310 identifying the purchase attempt of one or more items online, such as from a website hosted by web server 104. For example, a customer may engage customer computing device 112 to access the website hosted by web server 104, which may be a retailer's website that allows for the purchase of one or more items. Upon input from the customer, customer computing device 112 may transmit purchase request data 306 to web server 104. Purchase request data 306 may identify a purchase request of one or more items, such as one or more items the customer has added to an online shopping cart of the website. In response, web server 104 transmits online purchase data 310 to fraud detection computing device 102.

Online purchase data 310 may include, for example, one or more of the following: an identification of one or more items being purchased; an identification of the customer (e.g., customer ID, passport ID, driver's license number, etc.); an image of an identification of the customer; a monetary amount (e.g., price) of each item being returned; the method of payment used to purchase the items (e.g., credit card, cash, check); a Universal Product Code (UPC) number for each item; a time and/or date; whether the customer is attempting a "guest" checkout or a "signed-in" checkout; online account information for the customer; and/or any other data related to the attempted purchase transaction.

Fraud detection computing device 102 may execute one or more fraud detection models based on online purchase data 310 to generate one or more fraud detection scores. In some examples, fraud detection score 102 associates customer history data 350 with store purchase data 302. For example, online purchase data 310 may identify a name or online ID of the customer. Based on the name or online ID of the customer, fraud detection computing device may obtain customer history data 350 from database 116 for the customer. Customer history data 350 may include, for example, a customer ID 352 (e.g., a customer name, an ID number, online ID, etc.), store history data 354 identifying historical in-store purchase transactions, and online history data 356 identifying online purchase transactions for the customer.

Fraud detection computing device 102 may determine a tier based on the fraud detection scores. For example, fraud detection computing device 102 may determine the tier based on a range each fraud detection score falls within. Fraud detection computing device 102 may then consolidate the determined tiers to generate a global tier for the purchase transaction identified by store purchase data 302.

Fraud detection computing device 102 may also determine a bin for one or more predictable features associated with online purchase data 310. The predictable features may have been predetermined by fraud detection computing device. For example, fraud detection computing device 102 may determine, based on online purchase data 310 and/or associated customer history data 350, a bin for each predetermined predictable feature based on the application of one or more binning algorithms. In some examples, the binning algorithm is a decision tree. Execution of the decision tree may determine a bin based on a value of the predictable feature. In some examples, execution of the decision tree may determine a bin based on the presence, or absence, of the predictable feature. For example, the decision tree may determine a first bin if the customer has made a purchase in the last 30 days, and determine a second bin if not.

Fraud detection computing device 102 may then apply a decision matrix, such as one identified by decision matrix data 370 in database 116, to the determined tier and bins to determine if the transaction identified by online purchase data 310 is fraudulent. For example, fraud detection computing device 102 may compare the determined tier and bins to tiers and bins identified by decision matrix data 370 to determine whether online purchase data 310 is fraudulent.

FIG. 5 illustrates an example decision matrix 500 that may be identified and characterized by decision matrix data 370. As illustrated, decision matrix 500 includes a plurality of columns and a plurality of rows. Specifically, decision matrix 500 includes a fraud probability tier column 502 identifying fraud detection model tiers, which may have been previously determined. For example, fraud probability tier column 502 identifies tiers "B," (in rows 550, 552, 554, and 556) "C," (in row 558) and "D" (in row 560). Decision matrix 500 also includes multiple predictable feature columns 504, 506, 508, where each predictable feature column corresponds to a predetermined predictable feature. Moreover, each predictable feature column identifies a bin (e.g., a risk category) for the corresponding predictable feature. Each bin may have been previously determined. Specifically, in this example, decision matrix 500 includes first feature bin column 504, second feature bin column 506, and last feature bin column 508. Based on the number of predictable features, decision matrix 500 may include less, or more, predictable feature columns, where each predictable feature column corresponds to a previously determined predictable feature. Decision matrix 500 may include a row for any possible combination of fraud probability tiers and predictable features that a transaction, such as a real-time transaction, may be associated with.

Decision matrix 500 may optionally include a fraud rate column 510, an impacted orders column 512, and an impacted gross merchandise volume (GMV) column 514. Fraud rate column 510 identifies a historical fraud rate based on historical transaction data identifying transactions over a period of time (e.g., week, month, year, etc.) that meet the conditions identified in the corresponding fraudulent probability tier column 502 and multiple predictable feature columns 504, 506, 508. For example, out of all transactions over the period of time that meet the conditions of row 550 in the corresponding fraudulent probability tier column 502 and multiple predictable feature columns 504, 506, 508, 45% of those transactions were fraudulent.

Impacted orders column 512 identifies a percentage of all historical orders over a period of time that were fraudulent and met the conditions identified in the corresponding fraudulent probability tier column 502 and multiple predictable feature columns 504, 506, 508. For example, impacted orders column 512 identifies in row 550 that 0.5% of all orders over a period of time were deemed fraudulent (e.g., "impacted") in accordance with the corresponding fraudulent probability tier column 502 and multiple predictable feature columns 504, 506, 508.

The impacted GMV column 514 identifies a percentage of merchandise associated with all historical orders over a period of time that were fraudulent and met the conditions identified in the corresponding fraudulent probability tier column 502 and multiple predictable feature columns 504, 506, 508. For example, impacted GMV column 514 identifies in row 550 that 0.3% of all gross merchandise associated with historical orders over a period of time were deemed fraudulent (e.g., "impacted") in accordance with the corresponding fraudulent probability tier column 502 and multiple predictable feature columns 504, 506, 508.

Decision matrix 500 also includes a decision column 560 that identifies a decision of whether a transaction is fraudulent. For example, decisions may include "ALLOW," where the transaction is allowed, "DENY," where the transaction is denied, or "CHALLENGE," where the transaction is challenged, as described in further detail below. The decisions are generated based on the fraud rate column 510, the impacted order column 512, and the impacted GMV column 514 corresponding to the same row as the decision. In some examples, the decisions are configured by a user based on the corresponding values of the fraud rate column 510, the impacted order column 512, and the impacted GMV column 514. For a transaction meeting all of the conditions listed in a particular row (e.g., row 550) including the fraudulent probability tier column 502 and multiple predictable feature columns 504, 506, 508, the decision in the corresponding decision column 560 is generated.

For example, if a transaction, such as one identified by store purchase data 302 or online purchase data 310, satisfies the conditions located in row 550 including a fraud probability tier of "B," a first predictable feature bin of "R1," a second predictable feature bin of "R1," and a last predictable feature bin of "R1," the decision matrix identifies a decision of "DENY." In this example, fraud detection computing device 102 determines that the transaction is fraudulent and should be denied. If, however, a transaction satisfies the conditions in row 560, including a fraud probability tier of "D," a first predictable feature bin of "R4," a second predictable feature bin of "R3," and a last predictable feature bin of "R4," the decision matrix identifies a decision of "ACCEPT." In this example, fraud detection computing device 102 determines that the transaction is not fraudulent and should be allowed.

As a third example, if a transaction satisfies the conditions located in row 558 including a fraud probability tier of "C," a first predictable feature bin of "R1," a second predictable feature bin of "R3," and a last predictable feature bin of "R3," the decision matrix identifies a decision of "CHALLENGE." Here, fraud detection computing device 102 determines that the transaction should be further reviewed, such as by a reviewer, and thus should be forwarded for such review to determine if the transaction should be allowed.

For example, and with reference back to FIG. 3, if fraud detection computing device 102 determines, based on decision matrix data 370 (e.g., decision matrix 500), that a transaction should be challenged, fraud detection computing device 102 transmits review request data 319 to review center 320. Review center 320 may include, for example, one or more computing devices, such as servers, to receive review request data 319. Review request data 319 identifies and characterizes the transaction identified by either store purchase data 302 or online purchase data 310 (based on which was received), and may include an identification of associated customer history data 350. In some examples, at review center 320, the one or more computing devices display at least a portion of review request data 319, such as via a display, for review by one or more review personnel. In some examples, review personnel may request additional data regarding the transaction, such as associated customer history data 350, from database 116. Once review personnel make a decision, they may provide an input, such as via a keyboard or a touchscreen, either allowing, or denying, the corresponding transaction. In response, the one or more computing devices transmit review response data 321 to fraud detection computing device 102, where review response data 321 identifies whether the corresponding transaction is to be allowed. For example, review response data 321 may identify whether to "ACCEPT" or "DENY" the transaction.

As illustrated in FIG. 3, decision matrix data 370 may identify a plurality of decision matrices, such first decision matrix 372 up to last decision matrix 374. In some examples, a plurality of decision matrices may include differing transaction allowability decisions (e.g., as indicated in decision column 510 of decision matrix 500) for similar fraudulent probability tier and predictable feature conditions. For example, while first decision matrix 372 may include the same conditions and decision outcomes as illustrated in decision matrix 500 of FIG. 5, last decision matrix 374 may include differing decision outcomes for the same conditions. As an example, row 556 of decision matrix 500 indicates in decision column 510 a decision of "DENY." Given the same conditions, last decision matrix 374 may indicate a decision of "ALLOW" for row 556.

In some examples, fraud detection computing device 102 may select which of the plurality of decision matrixes to apply to a given transaction (e.g., as identified by store purchase data 302 and online purchase data 310). In some examples, a user may provide a configuration setting indicating to fraud detection computing device 102 which of the plurality of decision matrices to apply. In some examples, fraud detection computing device 102 determines which of the plurality of decision matrices to apply to a transaction based on one or more of a time of year, geographic location of the purchasing customer, volume of merchandise being sold in a period (e.g., volume that has sold over last three months), or any other suitable consideration.

Once fraud detection computing device 102 determines whether a transaction, such as one identified by store purchase data 302 or online purchase data 310, is fraudulent by applying a decision matrix identified by decision matrix data 370, fraud detection computing device 102 may generate a response indicating whether the transaction is allowed. For example, after determining whether a transaction identified by store purchase data 302 is allowed, fraud detection computing device 102 may generate store allowance data 304 identifying whether the transaction is allowed (e.g., "ALLOWED" or "DENIED"). Fraud detection computing device 102 may transmit store allowance data 304 to store 109. If fraud detection computing device 102 determined that the transaction needs further review (e.g., "CHALLENGE") (and transmitted review request data 319 to review center 320), upon receiving the decision identified in review response data 321, fraud detection computing device 102 generates and transmits store allowance data 304 identifying the decision received to store 109.

Similarly, after determining whether a transaction identified by online purchase data 310 is allowed, fraud detection computing device 102 may generate online allowance data 312 identifying whether the transaction is allowed (e.g., "ALLOWED" or "DENIED"). Fraud detection computing device 102 may transmit online allowance data 312 to web server 104. If fraud detection computing device 102 determined that the transaction needed further review (e.g., "CHALLENGE") (and transmitted review request data 319 to review center 320), upon receiving the decision identified in review response data 321, fraud detection computing device 102 generates and transmits online allowance data 312 identifying the decision received to web server 104.

Web server 104 may then generate and transmit to customer computing device 112 purchase response data 308 identifying the decision (e.g., "PURCHASE COMPLETE" for allowed transactions, or "PURCHASE DENIED" for denied transactions). In some examples customer computing device 112 may display the decision.

Figure 4:
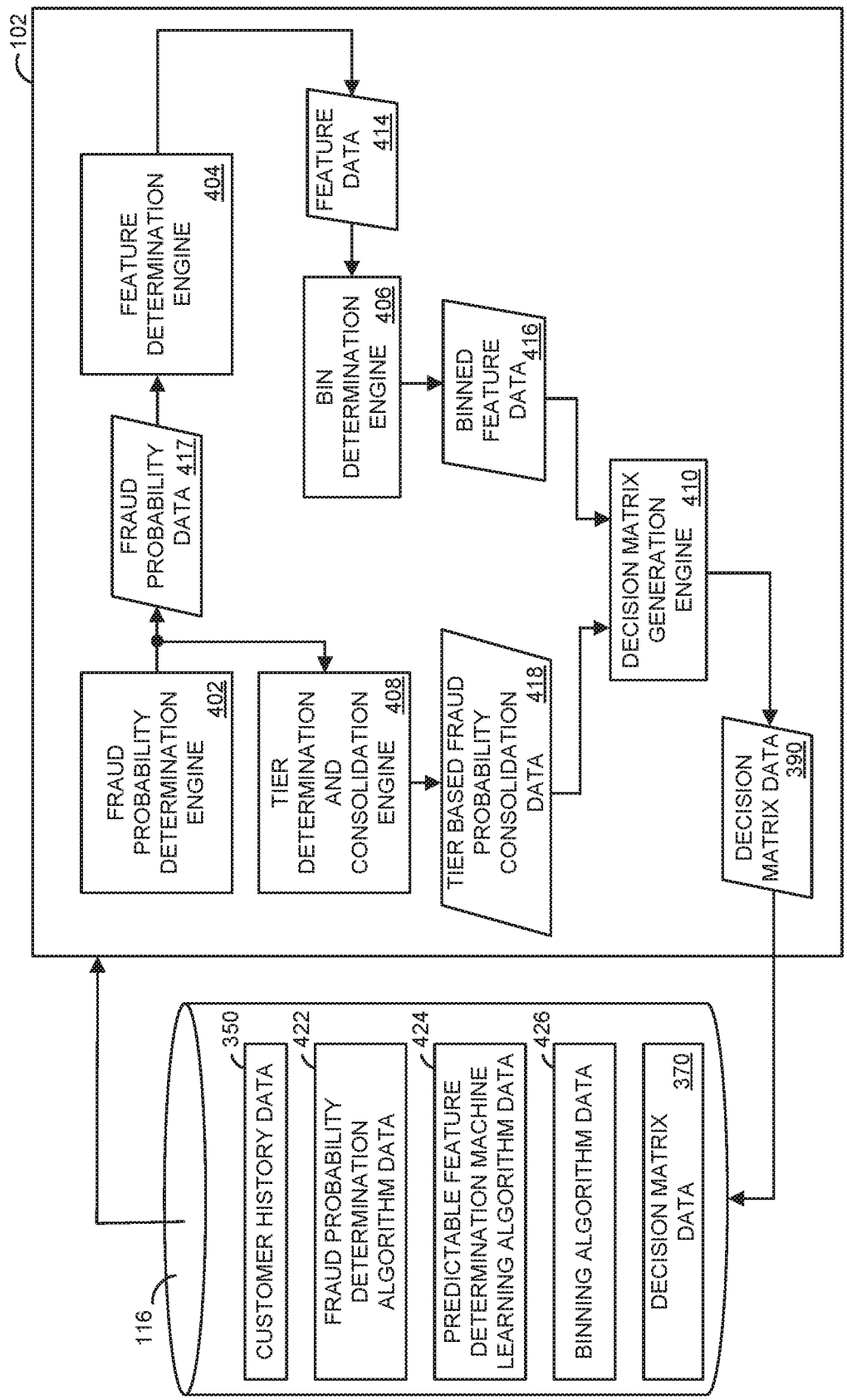
FIG. 4 is a block diagram illustrating examples of various portions of the fraud detection computing device of FIG. 1 in accordance with some embodiments.

FIG. 4 is a block diagram illustrating examples of various portions of the fraud detection computing device 102 of FIG. 1. As indicated in the figure, fraud detection computing device 102 includes fraud probability determination engine 402, feature determination engine 404, bin determination engine 406, tier determination and consolidation engine 408, and decision matrix generation engine 410. In some examples, one or more of fraud probability determination engine 402, feature determination engine 404, bin determination engine 406, tier determination and consolidation engine 408, and decision matrix generation engine 410 may be implemented in hardware. In some examples, one or more of fraud probability determination engine 402, feature determination engine 404, bin determination engine 406, tier determination and consolidation engine 408, and decision matrix generation engine 410 may be implemented as an executable program maintained in a tangible, non-transitory memory, such as instruction memory 207 of FIG. 2, that may be executed by one or processors, such as processor 201 of FIG. 2.

Fraud probability determination engine 402 may execute one or more fraud detection models (e.g., algorithms), such a model identified and characterized by fraud probability determination algorithm data 422, to generate fraud detection scores. The fraud detection models may operate on customer history data 350, and may generate fraud detection scores that identify probabilities that each transaction identified by customer history data 350 is a fraud. Fraud probability determination algorithm data 422 may identify and characterize, for example, one or more decision trees, supervised machine learning algorithms, or any other suitable fraud detection models. Fraud probability determination engine 402 may generate fraud probability data 417 identifying the fraud detection scores.

Feature determination engine 404 receives fraud probability data 417 from fraud probability determination engine 402 and, based on the identified fraud detection scores, applies one or more machine learning algorithms, such as Logistics Regression, Random Forest, Gradient Boosting Machines, or any other suitable learning algorithms, to identify a number of most predictable features identified by customer history data 350. For example, feature determination engine 404 may execute one or more algorithms identified by fraud probability determination algorithm data 422 to determine those features in customer history data 350 that, if present, are associated with a probability that a transaction is fraudulent. In some examples, a user may configure the number of most predictable features. For example, the user may provide an input to fraud detection computing device 102 via, for example, input/output device 203, identifying the number of most predictable features. In this example, feature determination engine 404 determines the selected number of features that are most predictable. Feature determination engine 404 generates feature data 414 identifying and characterizing the determined predictable features.

Bin determination engine 406 receives feature data 414 and bins each identified predictable feature into one or more bins (e.g., categories). For example, bin determination engine 406 may obtain ginning algorithm data 426 from database 116, which may identify and characterize one or more binning algorithms. The binning algorithms may include, for example, feature scaling and normalization, weight of the evidence, variations of principal component analysis (PCA), or any other suitable binning algorithm. Bin determination engine 406 generates binned feature data 416 identifying the bin associated with each predictable feature.

Tier determination and consolidation engine 408 determines a tier for a plurality of transactions identified by customer history data 350 based on fraud probability data 417 obtained from fraud probability determination engine 402. For example, depending on the fraud detection score associated with each transaction for each model (e.g., models executed by fraud probability determination engine 402), the transaction is associated with a tier. For example, transactions that, according to a first model, result in a fraudulent detection score that falls within a first range may be associated with a first tier. Similarly, fraud detection scores within a second range may be associated with a second tier, fraud detection scores within a third range may be associated with a third tier, and fraud detection scores within a fourth range may be associated with a fourth tier, for each model. Tier determination and consolidation engine 408 may then consolidate the tiers from various fraud detection models to generate common tiers that each of the corresponding historical transactions (e.g., as identified by customer history data 350) may be associated with. Tier determination and consolidation engine 408 generates tier-based fraud probability consolidation data 418 identifying and characterizing the common tiers associated with each of the historical transactions.

Decision matrix generation engine 410 generates decision matrix data 370 identifying one or more decision matrices based on tier-based fraud probability consolidation data 418 and binned feature data 416. Decision matrix data 370 identifies transaction allowability decisions based on one or more of the common tiers identified by tier-based fraud probability consolidation data 418 and the bins identified by binned feature data 416. Decision matrix generation engine 410 may store decision matrix data 370 in database 116, for example. Fraud detection computing device 102 may employ one or more decision matrices identified and characterized by decision matrix data 370 when receiving indication of a transaction, such as a real-time transaction (e.g., a transaction identified by store purchase data 302 and/or online purchase data 310).

Figure 6:
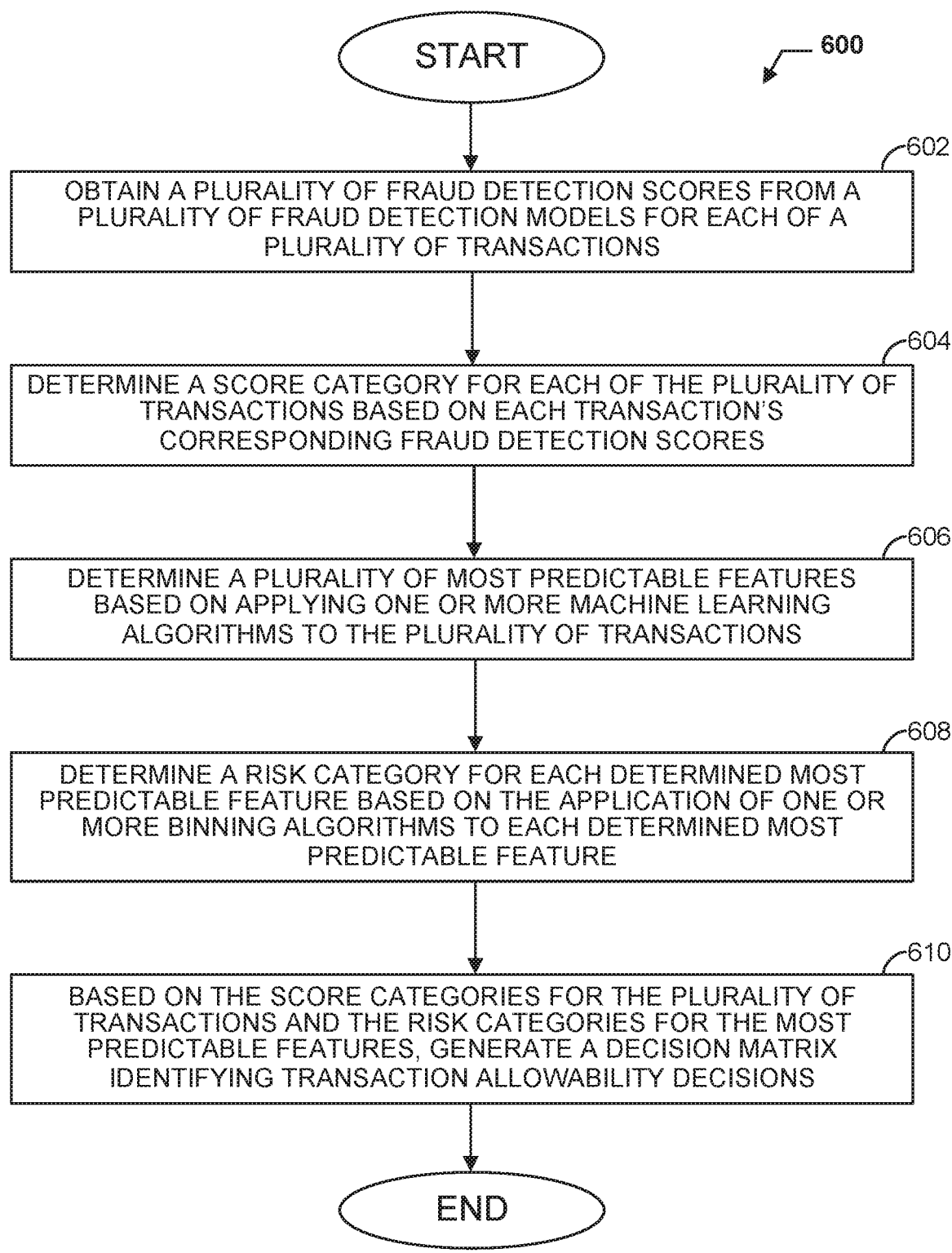
FIG. 6 is a flowchart of an example method that can be carried out by the fraud detection system 100 of FIG. 1 in accordance with some embodiments.

FIG. 6 is a flowchart of an example method 600 that can be carried out by the fraud detection system 100 of FIG. 1. Beginning at step 602, for each of a plurality of transactions, a fraud detection score is obtained from each of a plurality of fraud detection models. For example, fraud detection computing device 102 may execute a plurality of fraud detection models that operate on historical transaction data (e.g., consumer history data 350) to generate the plurality of fraud detection scores, where each fraud detection score is associated with a transaction identified by the historical transaction data. At step 604, a score category for each of the plurality of transactions is determined based on each transaction's corresponding fraud detection scores. For example, fraud detection computing device 102 may determine a tier for each transaction based on the fraud detection score determined by each model.

Proceeding to step 606, a plurality of most predictable features are determined. The most predictable features are determined based on applying one or more machine learning algorithms to the plurality of transactions. For example, fraud detection computing device 102 may provide the plurality of transactions to a machine learning algorithm, where each transaction is associated with one or more fraud detection scores (e.g., supervised learning). Execution of the machine learning algorithm may yield a number of predictable features (e.g., a number of features associated with fraud detection scores of 45% or greater).

At step 608, a risk category is determined for each predictable feature. The risk categories may be determined based on applying one or more binning algorithms to the predictable features. For example, fraud detection computing device 102 may apply one or more binning algorithms as identified by binning algorithm data 426 to the predictable features. At step 610, a decision matrix is generated based on the score categories for the plurality of transactions and on the risk categories for the predictable features. The decision matrix identifies transaction allowability decisions (e.g., such as "ALLOW," "DENY," or "CHALLENGE"). For example, fraud detection computing device 102 may generate decision matrix data 370 identifying and characterizing one or more decision matrices. In some examples, the decision matrix is stored in memory, such as in database 116. The method then ends.

Figure 7:
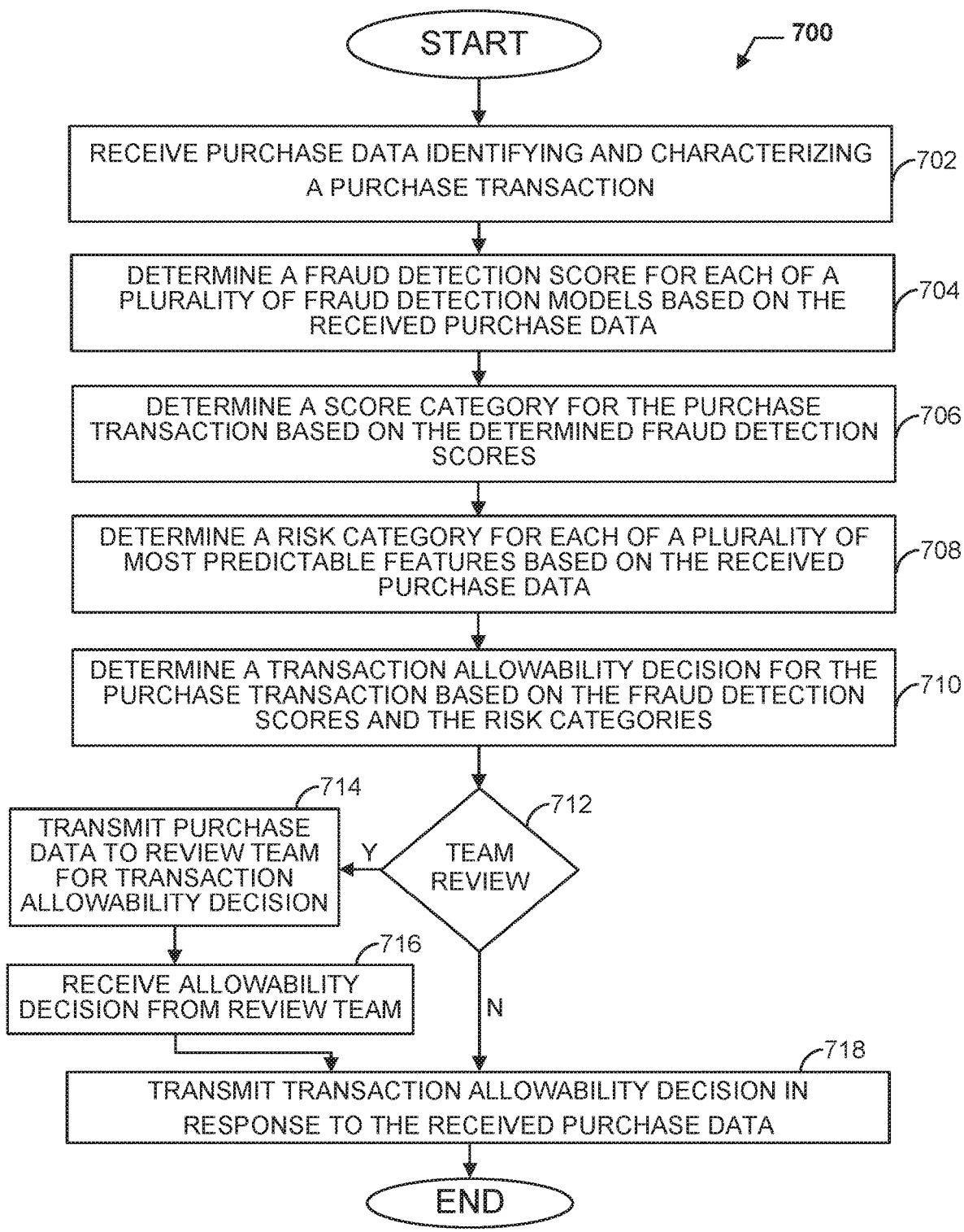
FIG. 7 is a flowchart of another example method that can be carried out by the fraud detection system 100 of FIG. 1 in accordance with some embodiments.

FIG. 7 is a flowchart of another example method 700 that can be carried out by the fraud detection system 100 of FIG. 1. At step 702, purchase data identifying and characterizing a purchase transaction is received. For example, fraud detection computing device 102 may receive online purchase data 312 identifying an attempted online purchase transaction. At step 704, a fraud detection score for each of a plurality of fraud detection models is determined based on the received purchase data. For example, fraud detection computing device 102 may apply a plurality of fraud detection models to online purchase data 312 to determine a fraud detection score for each model.

Proceeding to step 706, a score category for the purchase transaction is determined based on the determined fraud detection scores. As an example, fraud detection computing device 102 may determine a tier based on a score range each fraud detection score falls within. Fraud detection computing device 102 may then consolidate the determined tiers to generate the score category (e.g., global tier) for the purchase transaction. At step 708, a risk category is determined for each of a plurality of predictable features based on the received purchase data. For example, fraud detection computing device 102 may determine whether the received purchase data includes each predictable feature, and determine the risk category for the predictable feature based on the determination (e.g., one value if the predictable feature is included, another value if the predictable feature is not included).

At step 710, based on the determined fraud detection scores and the risk categories, a transaction allowability decision is determined. For example, fraud detection computing device 102 may apply a decision matrix, such as the one generated by method 600, to determine whether the purchase transaction should be allowed, denied, or challenged. In some examples, fraud detection computing device 102 compares the determined fraud detection scores and risk categories correspond to conditions identified in the decision matrix that result in a denial of the purchase transaction. If the conditions that result in a denial are satisfied by the determined fraud detection scores and risk categories, fraud detection computing device 102 disallows the transaction (e.g., does not allow the transaction to complete).

Proceeding to step 712, a determination is made as to whether the transaction allowability decision is a challenge. If the transaction allowability decision is a challenge, the method proceeds to step 714, where the purchase data is transmitted to a review team, such as at review center 320, for a determination as to whether the transaction should be allowed. For example, fraud detection computing device 102 may transmit review request data 319 identifying the transaction to review center 320. From step 714 the method proceeds to step 716, where an allowability decision is received from the review team. For example, fraud detection computing device 102 may receive review response data 321 identifying whether the transaction should be allowed (e.g., "ALLOW" or "DENY").

From step 716 the method proceeds to step 718. In addition, if, back at step 712, the transaction allowability decision is not a challenge, the method also proceeds to step 718. At step 718, the transaction allowability decision is transmitted in response to the received purchase data. For example, fraud detection computing device 102 may transmit purchase allowance data 312 to web server 104 identifying whether the transaction identified by online purchase data 310 should be allowed. The method then ends.

Figure 8:
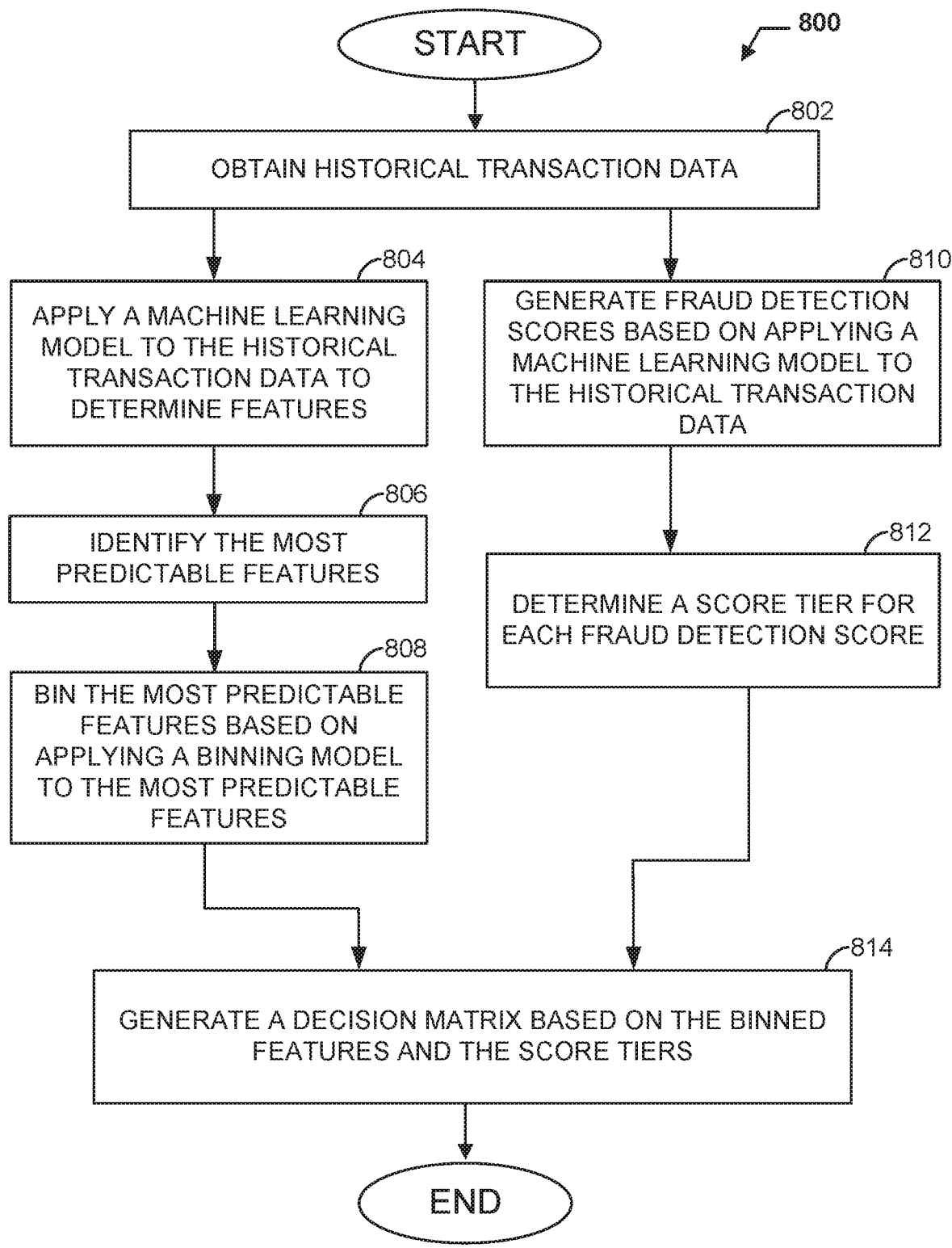
FIG. 8 is a flowchart of yet another example method that can be carried out by the fraud detection system 100 of FIG. 1 in accordance with some embodiments.

FIG. 8 is a flowchart of another example method 800 that can be carried out by the fraud detection system 100 of FIG. 1. At step 802, historical transaction data, such as historical transaction data identified by customer history data 350, is obtained. At step 804, a machine learning algorithm, such as one based on Gradient Boosting Machines or Logic Regression, is applied to the historical transition data to determine features. Proceeding to step 806, the most predictable features of the features identified in step 804 are identified. For example, the most predictable features may be those with higher relative scores as generated by the machine learning algorithm. At step 808, the most predictable features are binned based on applying a binning model to the most predictable features.

Back at step 802, the method, either simultaneously or subsequently to proceeding to step 804, also proceeds to step 810. At step 810, fraud detection scores are generated based on applying a machine learning model, such as one based on Gradient Boosting Machines or Logic Regression, to the historical transaction data. Proceeding to step 812, a score tier is determined for each fraud detection score.

From steps 808 and 812, the method proceeds to step 814 where a decision matrix, such as one identified by decision matrix data 370, is generated. The decision matrix is generated based on the binned features and the score tiers. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:
1. A system comprising:
 a computing device configured to:
  receive purchase data from a first device over a communication network, wherein the received purchase data comprises information associated with at least one purchase transaction;
  generate at least a first value based on the received purchased data, wherein the at least first value comprises information about whether the at least one purchase transaction is fraudulent;
  determine a value category for the at least one purchase transaction based on the at least first value, wherein determining the value category further comprises:
   applying, using a first machine learning process, each of a plurality of models to the at least one purchase transaction to generate a model score for each of the plurality of models;
   determining a model category for each of the plurality of models based on the corresponding model score; and
   determining the value category for the at least one purchase transaction based on the determined model categories;
  determine a plurality of features associated with the first value based on applying a second machine learning process to the purchase data and the first value, wherein each feature of the plurality of features is associated with at least a second value;
  determine a risk category for each of the plurality of features based on applying at least one binning process to the at least second value;
  generate decision data based on the determined value category and the determined risk categories associated with the plurality of features, wherein the decision data comprises information associated with a plurality of conditions for determining whether the at least one purchase transaction is fraudulent;
  determine whether the at least one purchase transaction is fraudulent based on the decision data;
  generate transaction allowability data associated with an allowance of the at least one purchase transaction in response to determining that the at least one purchase transaction is not fraudulent based on the decision data; or
  generate transaction allowability data associated with a rejection of the at least one purchase transaction in response to determining that the at least one purchase transaction is fraudulent based on the decision data; and
  transmit the transaction allowability data to the first device in response to the received purchase data.
2. The system of claim 1, wherein determining whether the at least one purchase transaction is fraudulent comprises comparing the decision data to the determined value category and the determined risk categories.
3. The system of claim 1, wherein the plurality of conditions comprises:
 at least one condition that the at least one purchase transaction is associated with at least one value category; and
 at least one condition that the at least one purchase transaction is associated with at least one risk category.
4. The system of claim 1, wherein determining whether the at least one purchase transaction is fraudulent comprises determining whether the at least one purchase transaction is to be allowed or denied.
5. The system of claim 1, wherein determining whether the transaction is fraudulent comprises determining whether the at least one purchase transaction is to be reviewed.

6. The system of claim 5, wherein the computing device is further configured to:
- transmit a review request message to a second computing device, wherein the review request message identifies the at least one purchase transaction; and
- receive, in response to the review request message, a review response message identifying whether the at least one purchase transaction is to be allowed or denied.

7. The system of claim 1, wherein determining the plurality of features comprises applying at least one machine learning process to the at least one transaction and the at least second value.

8. The system of claim 7, wherein the at least one machine learning process was trained with historical purchase transactions.

9. The system of claim 1, wherein the computing device is configured to determine customer history data associated with the at least one purchase transaction, wherein determining the value category for the at least one purchase transaction is based on the associated customer history data.

10. A method comprising:
- receiving, by a computing device, purchase data from a first device over a communication network, wherein the received purchase data comprises information associated with at least one purchase transaction;
- generate, by the computing device, at least a first value based on the received purchased data, wherein the at least first value comprises information about whether the at least one purchase transaction is fraudulent;
- determining, by the computing device, a value category for the at least one purchase transaction based on the at least first value wherein determining the value category further comprises:
  - applying, using a first machine learning process, each of a plurality of models to the at least one purchase transaction to generate a model score for each of the plurality of models;
  - determining a model category for each of the plurality of models based on the corresponding model score; and
  - determining the value category for the at least one purchase transaction based on the determined model categories;
- determining, by the computing device, a plurality of features associated with the first value based on applying a second machine learning process to the purchase data and the first value, wherein each feature of the plurality of features is associated with at least a second value;
- determining, by the computing device, a risk category for each of the plurality of features based on applying at least one binning process to the at least second value;
- generating, by the computing device, decision data based on the determined value category and the determined risk categories, wherein the decision data comprises information associated with a plurality of conditions for determining whether the at least one purchase transaction is fraudulent;
- determining, by the computing device, whether the at least one purchase transaction is fraudulent based on the decision data;
- generating, by the computing device, transaction allowability data associated with an allowance of the at least one purchase transaction in response to determining that the at least one purchase transaction is not fraudulent based on the decision data; and
- transmitting, by the computing device, the transaction allowability data to the first device in response to the received purchase data.

11. The method of claim 10, wherein determining whether the at least one purchase transaction is fraudulent comprises comparing the decision data to the determined value category and the determined risk categories.

12. The method of claim 10, wherein the plurality of conditions comprises:
- at least one condition that the at least one purchase transaction is associated with at least one value category; and
- at least one condition that the at least one purchase transaction is associated with at least one risk category.

13. The method of claim 10, wherein determining the plurality of features comprises applying at least one machine learning process to the at least one transaction and the at least second value.

14. A non-transitory computer readable medium having instructions stored thereon, wherein the instructions, when executed by at least one processor of a computing device, cause the computing device to perform operations comprising:
- receiving purchase data from a first device over a communication network, wherein the received purchase data comprises information associated with at least one purchase transaction;
- generating at least a first value based on the received purchased data, wherein the at least first value comprises information about whether the at least one purchase transaction is fraudulent;
- determining a value category for the at least one purchase transaction based on the at least first value wherein determining the value category further comprises:
  - applying, using a first machine learning process, each of a plurality of models to the at least one purchase transaction to generate a model score for each of the plurality of models;
  - determining a model category for each of the plurality of models based on the corresponding model score; and
  - determining the value category for the at least one purchase transaction based on the determined model categories;
- determining a plurality of features associated with the first value based on applying a second machine learning process to the purchase data and the first value, wherein each feature of the plurality of features is associated with at least a second value;
- determining a risk category for each of the plurality of features based on applying at least one binning process to the at least second value;
- generating decision data based on the determined value category and the determined risk categories, wherein the decision data comprises information associated with a plurality of conditions for determining whether the at least one purchase transaction is fraudulent;
- determining whether the at least one purchase transaction is fraudulent based on the decision data;
- generating transaction allowability data associated with an allowance of the at least one purchase transaction in response to determining that the at least one purchase transaction is not fraudulent based on the decision data; or
- generating transaction allowability data associated with a rejection of the at least one purchase transaction in response to determining that the at least one purchase transaction is fraudulent based on the decision data; and transmitting the transaction allowability data to the first device in response to the received purchase data.

15. The non-transitory computer readable medium of claim 14 further comprising instructions stored thereon that, when executed by the at least one processor, further cause the computing device to perform operations comprising applying at least one machine learning process to the at least one transaction and the at least second value.

16. The system of claim 1, wherein determining the value category for the at least one purchase transaction based on the at least first value further comprises:
   determining whether the first value is within a first range or a second range;
   determining a first value category for the at least one purchase transaction when the first value is within the first range; and
   determining a second value category for the at least one purchase transaction when the first value is within the second range.

17. The method of claim 10, wherein determining the value category for the at least one purchase transaction based on the at least first value further comprises:
   determining whether the first value is within a first range or a second range;
   determining a first value category for the at least one purchase transaction when the first value is within the first range; and
   determining a second value category for the at least one purchase transaction when the first value is within the second range.

18. The non-transitory computer readable medium of claim 14 further comprising instructions stored thereon that, when executed by the at least one processor, further cause the computing device to perform operations comprising:
   determining whether the first value is within a first range or a second range;
   determining a first value category for the at least one purchase transaction when the first value is within the first range; and
   determining a second value category for the at least one purchase transaction when the first value is within the second range.

* * * * *